US 6,659,238 B2

(12) United States Patent
Saito et al.

(10) Patent No.: US 6,659,238 B2
(45) Date of Patent: Dec. 9, 2003

(54) ELECTROMAGNETIC BRAKE

(75) Inventors: Makoto Saito, Kashiwa (JP); Masami Nakano, Yonezawa (JP)

(73) Assignee: Oriental Motor Co., Ltd., Tokyo (JP)

( * ) Notice: Subject to any disclaimer, the term of this patent is extended or adjusted under 35 U.S.C. 154(b) by 0 days.

(21) Appl. No.: 10/093,908

(22) Filed: Mar. 8, 2002

(65) Prior Publication Data

US 2002/0170791 A1 Nov. 21, 2002

(30) Foreign Application Priority Data

May 18, 2001 (JP) ........................................ 2001-148836

(51) Int. Cl.[7] ................................................ F16D 63/00
(52) U.S. Cl. .................................... 188/267.2; 188/161
(58) Field of Search ............................. 188/267.2, 267, 188/158–165, 67, 41, 171, 71.1; 267/140.14; 310/93, 77, 103, 105; 192/21.5; 482/903, 112; 318/742

(56) References Cited

U.S. PATENT DOCUMENTS

2002/0170791 A1 * 11/2002 Saito et al. .................. 188/267

FOREIGN PATENT DOCUMENTS

| JP | 6-38448 | * | 2/1994 |
| JP | 2002-130342 | * | 5/2002 |

OTHER PUBLICATIONS

Translation of JP 6–38448.*

* cited by examiner

Primary Examiner—Douglas C. Butler
(74) Attorney, Agent, or Firm—Trop, Pruner & Hu, P.C.

(57) ABSTRACT

The present invention relates to an electromagnetic brake. In an electromagnetic brake (11) comprising an electromagnetic brake body (13) having yoke members (15a and 15b) with a coil winding (14) and a brake movable member (16) formed of a magnetic material, which is disposed via an air gap (18) in a magnetic path formed by the electromagnetic brake body (13) and is fixed to a motor rotating shaft (2b), a magnetic fluid (20) is filled in the air gap (18), and a sealing member (19) for rotatably sealing the motor rotating shaft (2b) is disposed between the electromagnetic brake body (13) and the motor rotating shaft (2b) to prevent the magnetic fluid (20) from leaking, whereby the electromagnetic brake (11) is applied when the coil winding (14) is excited.

9 Claims, 5 Drawing Sheets

ELECTROMAGNETIC BRAKE

FIELD OF THE INVENTION AND RELATED ART STATEMENT

The present invention relates to an electromagnetic brake and, more particularly, to an excitation type electromagnetic brake for applying brake to a rotating shaft of a motor or the like via a magnetic fluid and a non-excitation type electromagnetic brake which incorporates a permanent magnet and performs braking action via a magnetic fluid. In this specification, the motor is not limited to an electric motor, and includes a motor and the like having a rotating shaft which are driven by a fluid pressure such as an oil pressure or an air pressure.

For example, an excitation type electromagnetic brake as shown in FIG. 8 has conventionally been used for the motor of this type.

Referring to FIG. 8, an excitation type electromagnetic brake 201 includes an electromagnetic brake body 203 which is mounted on a case (hereinafter referred simply to as a case) 202a integrated with a stator of an electric motor 202 and having a yoke member 205 with an exciting coil winding 204, and an armature 206 serving as a brake movable member fixed to a motor rotating shaft 202b by a fixing member 207 via a leaf spring 208. The armature 206 is designed so as to be capable of moving in the axial direction by an amount of deflection of the leaf spring 208. Reference numeral 209 denotes a rectifier circuit section.

When the exciting coil winding 204 is excited, the electromagnetic brake body 203 is operated. Specifically, the armature 206 is attracted toward the yoke member 205 against the urging force of the leaf spring 208, and comes into direct contact with the yoke member 205 or comes into contact with a friction plate, not shown, fixed to the yoke member 205. Therefore, a braking force is created by friction, so that the rotation of the rotating shaft 202b is stopped.

When the exciting coil winding 204 is not excited, the armature 206 is separated from the electromagnetic brake body 203 by the urging force of the leaf spring 208, so that the rotating shaft 202b is released from the brake.

However, the conventional excitation type electromagnetic brake 201 having a construction as described above has the following problems because braking action is performed by the friction:

(1) The braking force is changed by the condition of contact face of the yoke member 205 or the change in surface condition of the friction plate with passage of time, and the service life of brake is impaired by friction. Also, the condition of the friction surface changes with passage of time, so that the brake characteristics are unstable.
(2) When the armature 206 is attracted, there is produced a noise due to the contact of the armature 206 with the yoke member 205 on the electromagnetic brake body 203 side, and also there is produced a noise due to friction at the time of braking.
(3) Since there is an air gap in a magnetic path in which the electromagnetic brake body 203 produces an attracting force, it is necessary to consider the balance between the attracting force and the urging force of the leaf spring 208.
(4) The design of magnetic circuit is very complex; for example, the adjustment of the air gap is delicate.
(5) The braking force is determined by the coefficient of friction of the above-mentioned friction, and it is very difficult to adjust the attracting force of the electromagnetic brake body 203 in the range in which attraction can be effected. Therefore, it is difficult to control the braking force.

On the other hand, for example, a non-excitation type electromagnetic brake as shown in FIG. 9 has conventionally been used for the motor of this type.

Referring to FIG. 9, an electromagnetic brake 211 includes a brake disc 212 serving as a brake movable member, which is fixed to an output rotating shaft 214 of a motor 213, an electromagnetic brake body 215 having a yoke member 217 on the stator side with a coil winding 216, an armature 218 integrated with a brake lining material 218a, and a spring 219 which urges the armature 218 in the direction in which the armature 218 is separated from the electromagnetic brake body 215 to operate the brake. (The brake lining material 218a is sometimes integrated with the brake disc 212.)

When the coil winding 216 is not energized, the armature 218 is separated from the electromagnetic brake body 215 by the urging force of the spring 219, and the brake lining material 218a affixed to the armature 218 is brought into contact with the brake disc 212. Thereby, a braking force is produced by friction, and thus brake is applied to the output rotating shaft 214 of the motor 213.

Also, when the coil winding 216 is energized, the armature 218 is attracted to the electromagnetic brake body 215 against the urging force of the spring 219, and the brake lining material 218a is separated from the brake disc 212, by which the rotating shaft 214 is released from the brake.

In this electromagnetic brake 211, two or more pins 220 are erectly provided on the yoke member 217, and the pins 220 are engaged with pin holes 218b formed in the armature 218, by which the armature 218 is prevented from rotating together with the brake disc 212, and is guided slidably in the direction of the rotating shaft.

However, the conventional non-excitation type electromagnetic brake 211 constructed as described above has problems in that the brake force is changed by the change in surface condition of the brake lining material 218a with passage of time, and the service life of brake is impaired by the friction of the brake lining material 218a, and that there is produced a noise due to friction at the time of braking, and also when the armature 218 is attracted due to excitation, there is produced a noise due to the contact of the armature 218 with the yoke member 217 on the electromagnetic brake body 215 side.

Furthermore, since the armature 218 has a backlash in the direction of rotation, the rotating shaft 214 has a play when being held by the electromagnetic brake 211.

In particular, the electromagnetic brake 211 has problems in that there is a degree of (a non-negligible degree of) air gap in a magnetic path in which the electromagnetic brake body 211 produces an attracting force at the time of excitation, so that it is necessary to consider the balance between the attracting force and the urging force of the spring 219, and that the design of magnetic circuit is very complex; for example, the adjustment of the air gap is delicate.

OBJECT AND SUMMARY OF THE INVENTION

The present invention has been made in view of the above situation, and accordingly an object thereof is to provide an excitation type electromagnetic brake and a non-excitation type electromagnetic brake in which the above problems are solved, wear of the braking portion is eliminated, whereby the service life thereof can be prolonged, and also a noise produced by the braking portion can be eliminated.

Another object of the present invention is to provide an excitation type electromagnetic brake and a non-excitation type electromagnetic brake in which regarding the construction, in brake application, a movable portion is eliminated, so that the construction can be made simple, and also the number of parts can be decreased.

To achieve the above objects, the present invention provides an electromagnetic brake comprising an electromagnetic brake body having a yoke member with a coil winding and a brake movable member formed of a magnetic material, which is disposed via an air gap in a magnetic path formed by the electromagnetic brake body and is fixed to a rotating shaft, wherein a magnetic fluid is interposed or filled in the air gap, and fluid leakage preventive means is formed or disposed between the electromagnetic brake body and the brake movable member to prevent the magnetic fluid from leaking to the outside, whereby the rotating shaft is braked using the electromagnetic brake when the coil winding is excited.

In the electromagnetic brake, the fluid leakage preventive means is a sealing member, and the sealing member for rotatably sealing the rotating shaft is disposed to prevent the magnetic fluid from leaking from between the electromagnetic brake body and the rotating shaft.

In the electromagnetic brake, the brake movable member is a disc fixed at the end of the rotating shaft.

Also, the present invention provides an electromagnetic brake comprising an electromagnetic brake body having a yoke member with a coil winding so that a rotating shaft is disposed via an air gap in a magnetic path formed by the electromagnetic brake body, wherein a magnetic fluid is interposed or filled in the air gap, and a sealing member for rotatably sealing the rotating shaft is disposed to prevent the magnetic fluid from leaking from between the electromagnetic brake body and the rotating shaft, whereby the rotating shaft is braked using the electromagnetic brake when the coil winding is excited.

Also, the present invention provides an electromagnetic brake comprising an electromagnetic brake body having a yoke member with a coil winding, a brake movable member formed of a magnetic material, which is fixed to a rotating shaft, and a permanent magnet disposed in a magnetic path formed by the electromagnetic brake body and the brake movable member, wherein a magnetic fluid is interposed or filled between the electromagnetic brake body and the brake movable member, and the direction of magnetic force in the excited state of the electromagnetic brake body is made reverse to the direction of magnetomotive force of the permanent magnet, whereby the brake of the rotating shaft is released using the electromagnetic brake, and braking action is performed in a non-excitation state.

In the electromagnetic brake, the permanent magnet is disposed on the brake movable member side.

In the electromagnetic brake, the permanent magnet is disposed on the electromagnetic brake body side.

In the electromagnetic brake, an air gap is formed in a portion between the electromagnetic brake body and the brake movable member in which the magnetic fluid is filled.

Also, the present invention provides an electromagnetic brake comprising a guide rail formed of a magnetic material; an electromagnetic brake body having a yoke member with a coil winding, which is mounted on a carriage formed of a non-magnetic material; and a permanent magnet disposed on the electromagnetic brake body in a magnetic path formed by the electromagnetic brake body and the guide rail, the carriage on which the electromagnetic brake body is mounted being disposed on the guide rail via a roller so as to be capable of running, wherein a magnetic fluid is interposed between the electromagnetic brake body and the guide rail, and the direction of magnetic force in the excited state of the electromagnetic brake body is made reverse to the direction of magnetomotive force of the permanent magnet, whereby the electromagnetic brake is released, and braking action is performed in a non-excitation state.

The magnetic fluid used in the present invention is a colloidal fluid in which ferromagnetic powder (for example, fine particles of about 10 nm) is stably dispersed into a solution (for example, mineral oil, silicone oil, and other oils or water as well as organic solvent). This fluid is chained by magnetism and is made in a solid form or in a fixed state. Even if a shearing force higher than an allowable value acts, the chain of fluids merely separates, and the magnetic powder itself is not affected.

Since the electromagnetic brake in accordance with the present invention is constructed as described above, the magnetic fluid produces a resistance to shearing caused by a fixed chain in a fixed magnetic field, and even after being sheared, it produces a fixed resistance. The resistance at this time can be adjusted by the intensity of magnetic field, and can be made higher than the brake frictional force. Therefore, the whole of the electromagnetic brake can be made smaller in size, and also there is no friction because the electromagnetic brake has no friction parts, which leads to a long service life.

Also, since an armature, which is a conventional movable part, is not needed, no noise is produced at the time of brake application.

Also, in the non-excitation type electromagnetic brake of the present invention, a direct current is caused to flow, and the intensity of magnetic field is adjusted so that a minute magnetic field remains in the magnetic path in order to prevent the magnetic fluid from leaking to the outside when the electromagnetic brake body is excited to release the brake. In this case, the configuration should be such that the action of the magnetic field due to the remaining minute magnetic field does not provide a load on the rotating shaft during rotation. In the case where the action of the magnetic field due to the remaining minute magnetic field is not negligible as a load on the rotating shaft during rotation, a coating for preventing the magnetic fluid from leaking is applied to make the minute magnetic field zero.

Since there is basically no air gap in the magnetic path of the electromagnetic brake in accordance with the present invention, the magnetic resistance can be decreased, and the magnetism design can be simplified.

Also, in comparison with the conventional electromagnetic brake, in the electromagnetic brake in accordance with the present invention, there is no movable part such as a leaf spring, return spring, and armature, so that the construction can be simplified, and the number of parts can be decreased.

For the electromagnetic brake in accordance with the present invention, fundamentally, a subject to which the brake is applied is not limited to a rotating shaft, and in construction, the present invention can be applied to a linear mechanism.

As is apparent from the above description, according to the electromagnetic brake in accordance with the present invention, wear of the braking portion is eliminated, whereby the service life thereof can be prolonged, and also a noise produced by the braking portion can be eliminated.

Also, according to the present invention, there can be achieved an effect that in brake application, a movable portion is eliminated, so that the construction can be made simple, and also the number of parts can be decreased.

Further, since the shearing force of the magnetic fluid can take a larger value than that of friction, the brake itself can be made smaller.

In addition, the shearing force of the magnetic viscous fluid is stable with respect to the rotational speed of the motor rotating shaft and ambient temperature, so that a stable electromagnetic brake can be provided. Further, the current flowing in the exciting coil winding of the electromagnetic brake body can be regulated to control the braking force freely.

DETAILED DESCRIPTION OF PREFERRED EMBODIMENTS

Preferred embodiments of the present invention will now be described in detail illustratively with reference to the accompanying drawings.

[First Embodiment]

Figure 1:
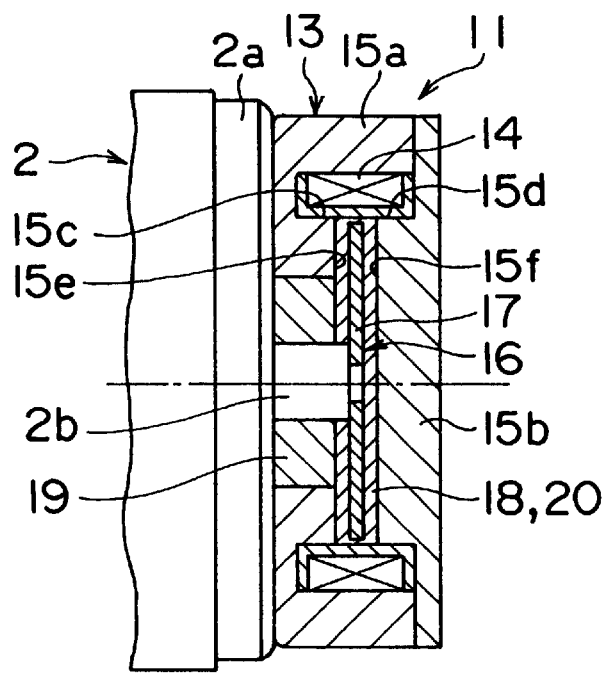
FIG. 1 is a sectional view of an excitation type electromagnetic brake, showing a first embodiment of an electromagnetic brake in accordance with the present invention.
Figure 2:
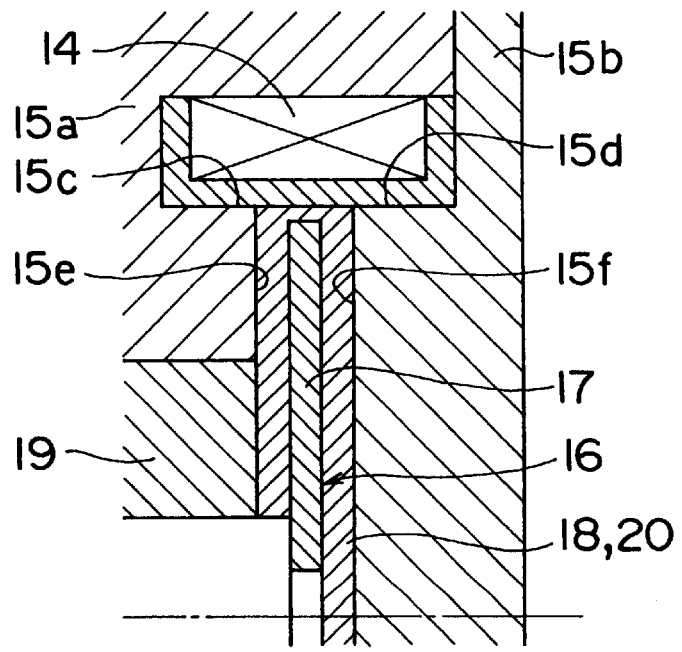
FIG. 2 is a partially enlarged view of FIG. 1.

FIG. 1 is a sectional view of an excitation type electromagnetic brake, showing a first embodiment of an electromagnetic brake in accordance with the present invention, and FIG. 2 is a partially enlarged view of FIG. 1.

Referring to FIGS. 1 and 2, an excitation type electromagnetic brake 11 for a motor includes an electromagnetic brake body 13 installed at the end of a case 2a of a motor 2 and a brake movable member 16 fixed to a rotating shaft 2b, which is a rotor output shaft of the motor 2. The material of the rotating shaft 2b may be a magnetic material or may be a non-magnetic material.

The electromagnetic brake body 13 includes an exciting coil winding 14 wound with the rotating shaft 2b being the center axis, which is contained in the electromagnetic brake body 13, a first yoke member 15a formed of a magnetic material, through which the motor rotating shaft 2b passes in the central portion thereof and which has a main portion having a columnar external shape and a step portion 15c on the inner peripheral face side of the exciting coil winding 14, and a second yoke member 15b formed of a magnetic material, which is of a disc shape having a step portion 15d whose small outside diameter portion has a diameter smaller than the outside diameter thereof, the second yoke member 15b being sealingly fixed to the end of the first yoke member 15a with a not illustrated fastening member or an adhesive.

The brake movable member 16 is a member having a disc portion 17 formed of a magnetic material. The disc portion 17 is transversely disposed in a cylindrical air gap 18 formed between side faces 15e and 15f of the step portions 15c and 15d of the first and second yoke members 15a and 15b, respectively, in a magnetic path formed by the yoke members 15a and 15b of the electromagnetic brake body 13, and is fixed to the motor rotating shaft 2b with a not illustrated screw member, key structure, or the like.

In the air gap 18, a magnetic fluid (or a magnetic viscous fluid) 20 is interposed or filled, and also a sealing member 19 for rotatably sealing the motor rotating shaft 2b is disposed between the first yoke member 15a of the electromagnetic brake body 13 and the motor rotating shaft 2b to prevent the magnetic fluid 20 from leaking.

When the exciting coil winding 14 is excited by being energized, a magnetic flux generated by the exciting coil winding 14 forms a magnetic path which passes through the first yoke member 15a, the magnetic fluid (or magnetic viscous fluid) 20, the disc portion 17 of the brake movable member 16, the magnetic fluid (or magnetic viscous fluid) 20, and the second yoke member 15b, and enters the first yoke member 15a again.

The rotating shaft 2b of the motor 2 shown in the figures is an example of a rotating shaft that is constructed so as to be integral with the motor 2. The motor 2 is not limited to one described above. Also, if the rotation is developed into the linear direction, the present invention can be applied to a linear motion.

The following is a description of the operation of the electromagnetic brake 11.

[Braking]

When the exciting coil winding 14 is excited by being energized, the magnetic fluid 20 is solidified by the magnetic flux, so that the magnetic disc portion 17 of the brake movable member 16 is fixed. Therefore, the motor rotating shaft 2b fixed to the disc portion 17 is restrained in the direction of rotation, so that the electromagnetic brake 11 is applied.

[Brake Releasing]

When the exciting coil winding 14 is demagnetized by being de-energized, the solidification of the magnetic fluid 20 is released, so that the magnetic disc portion 17 of the brake movable member 16 is released. Therefore, the motor rotating shaft 2b becomes rotatable, and thus the electromagnetic brake 11 is released.

Thus, the electromagnetic brake 11 can accomplish the same action as that of an excitation type brake in which braking action is performed only when the exciting coil winding 14 is energized, and is released at the time of being de-energized.

[Second Embodiment]

Figure 3:
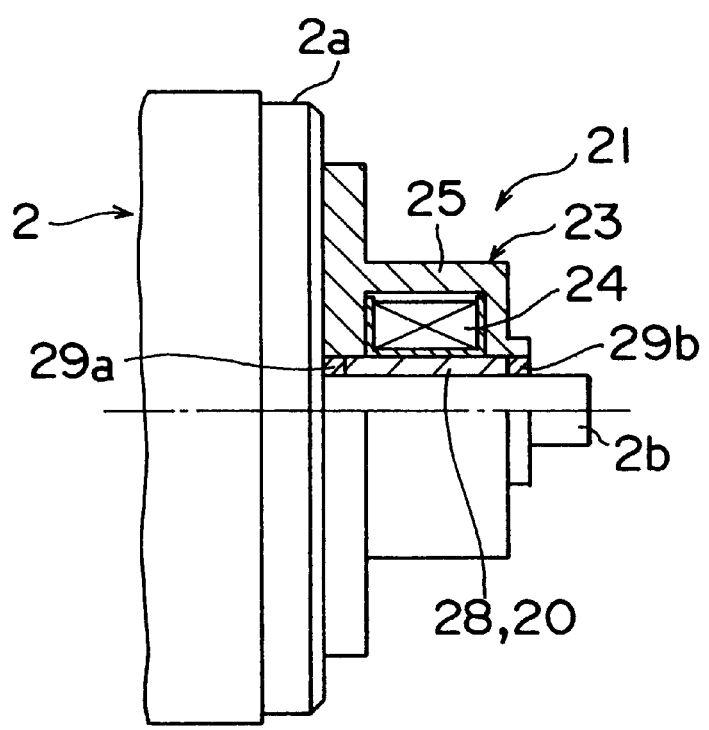
FIG. 3 is a side view of an excitation type electromagnetic brake, showing a second embodiment of an electromagnetic brake in accordance with the present invention, the upper half thereof being shown in cross section.

FIG. 3 is a side view of an excitation type electromagnetic brake, showing a second embodiment of an electromagnetic brake in accordance with the present invention, the upper half thereof being shown in cross section.

Referring to FIG. 3, an excitation type electromagnetic brake 21 for a motor includes a rotating shaft 2b formed of a magnetic material, which is a rotor output shaft of a motor 2, and an electromagnetic brake body 23 installed at the end of a case 2a of the motor 2. The material of the rotating shaft 2b may be a non-magnetic material.

The electromagnetic brake body 23 includes an exciting coil winding 24 wound with the rotating shaft 2b being the center axis, which is contained in the electromagnetic brake body 23, and a yoke member 25 formed of a magnetic material, through which the rotating shaft 2b passes in the central portion thereof via an air gap 28 and which has a main portion having a columnar external shape.

In the air gap 28, a magnetic fluid (or a magnetic viscous fluid) 20 is interposed or filled, and also sealing members 29a and 29b for rotatably sealing the motor rotating shaft 2b are disposed between both ends through which the motor rotating shaft 2b passes and the motor rotating shaft 2b to prevent the magnetic fluid 20 from leaking.

When the exciting coil winding 24 is excited by being energized, a magnetic flux generated by the exciting coil winding 24 forms a magnetic path which passes through the yoke member 25, the magnetic fluid (or magnetic viscous fluid) 20, the motor rotating shaft 2b, and the magnetic fluid (or magnetic viscous fluid) 20, and enters the yoke member 25 again.

The magnetic fluid 20 is filled in between the motor rotating shaft 2b and the yoke member 25. When the magnetic flux density of the magnetic path is increased, the magnetic fluid 20 is solidified, so that the shearing force of the magnetic fluid 20 in the air gap 28 increases. This shearing force can be adjusted by a current caused to flow in the exciting coil winding 14.

The operation of the electromagnetic brake 21 is the same as that described in the first embodiment as described below.

[Braking]

When the exciting coil winding 14 is excited by being energized, the magnetic fluid 20 is solidified by the magnetic flux, so that the motor rotating shaft 2b is fixed. Therefore, the motor rotating shaft 2b is restrained in the direction of rotation, so that the electromagnetic brake 21 is applied.

[Brake Releasing]

When the exciting coil winding 14 is demagnetized by being de-energized, the solidification of the magnetic fluid 20 is released, so that the motor rotating shaft 2b is released. Therefore, the motor rotating shaft 2b becomes rotatable, and thus the electromagnetic brake 11 is released.

Thus, the electromagnetic brake 21 can accomplish the same action as that of an excitation type brake in which braking action is performed only when the exciting coil winding 24 is energized, and is released at the time of being de-energized.

As is apparent from the above description, according to the excitation type electromagnetic brake of this embodiments, wear of the braking portion is eliminated, whereby the service life thereof can be prolonged, and also a noise produced by the braking portion can be eliminated. Also, according to this embodiments, there can be achieved an effect that in brake application, a movable portion is eliminated, so that the construction can be made simple, and also the number of parts can be decreased. Further, since the shearing force of the magnetic fluid can take a larger value than that of friction, the brake itself can be made smaller.

[Third Embodiment]

Figure 4:
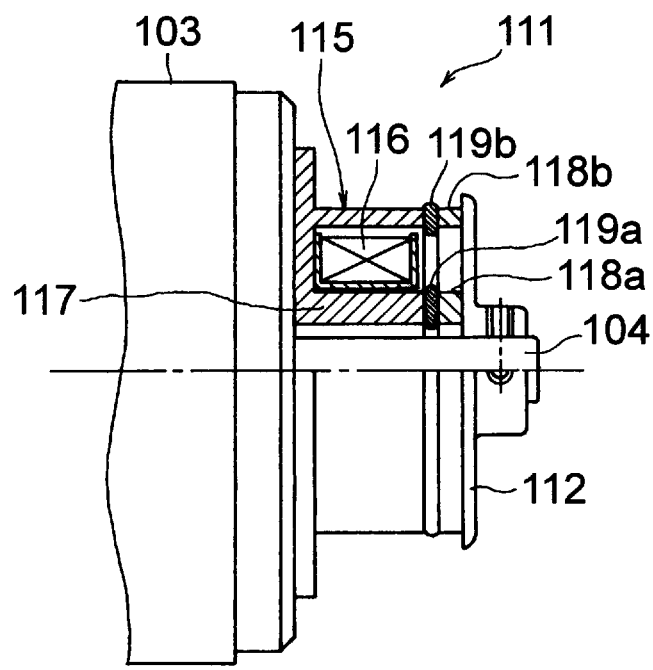
FIG. 4 is a side view of a non-excitation type electromagnetic brake, showing a third embodiment of an electromagnetic brake in accordance with the present invention, the upper half thereof being shown in cross section.

FIG. 4 is a side view of a non-excitation type electromagnetic brake, showing a third embodiment of an electromagnetic brake in accordance with the present invention, the upper half thereof being shown in cross section.

Referring to FIG. 4, a non-excitation type electromagnetic brake 111 includes a brake disc 112 serving as a brake movable part integrally forming a disc formed of a magnetic material, which is fixed to a rotor output shaft 104 of a motor 103 by a screw member, an electromagnetic brake body 115 consisting of a yoke member 117 having a concentric double annular shape (not limited to annular shape, and a U shape may be used) in cross section, which is provided on the stator side and has a coil winding 116 therein, two annular permanent magnets 118a and 118b fixed concentrically to the brake disc 112 serving as a brake movable part, which are provided so as to face the double annularly shaped yoke member 117 and whose magnetic pole directions are reverse to each other in the axial direction of the rotating shaft 104, and magnetic fluids 119a and 119b interposed or filled between the contact faces of the double annularly shaped yoke member 117 and the annular permanent magnets 118a, 118b.

When the coil winding 116 is de-energized, a magnetic flux coming out of the permanent magnet 118a forms a magnetic path which passes through the magnetic fluid 119a, the yoke 117, the magnetic fluid 19b, a permanent magnet 118b, and the brake disc 112, and enters the permanent magnet 118a again. The permanent magnets 118a and 118b may be disposed in any position as long as the magnetic path is formed, and the magnetic fluids 119a and 119b exist between a portion whose rotation is free and a portion whose rotation is restricted.

Thus, when the coil winding 116 is not excited, the magnetic fluids 119a and 119b are solidified by the magnetic flux of the permanent magnets 118a and 118b, so that the yoke member 117 and the permanent magnets 118a and 118b are fixed to each other. Therefore, the output rotating shaft 104 of the motor 103, which is fixed to the brake disc 112, is restrained in the direction of rotation, and thus the brake is applied. The rotating shaft 104 is restrained and held in the direction of rotation by the shearing force of the magnetic fluids 119a and 119b generated by the permanent magnets 118a and 118b.

Next, a direct current is supplied to the coil winding 116 to make the coil winding 116 in an excited state, by which the direction of magnetic force in the electromagnetic brake body 115 is made reverse to the direction of magnetomotive force of the permanent magnets 118a and 118b. Thereby, the magnetic flux passing through the magnetic fluids 119a and 119b is decreased, that is, the intensity of magnetic field is reduced to release the solidification of the magnetic fluids 119a and 119b, thereby releasing the electromagnetic brake.

Thus, the electromagnetic brake 111 can accomplish the same action as that of a non-excitation type electromagnetic brake in which the restraint (braking) of the rotating shaft 104 is released only when the coil winding 116 is energized, and the rotating shaft 104 is restrained at the time of being de-energized.

The above is a description of an example of a non-excitation type electromagnetic brake which is fixed to the rotating shaft 104 of the motor 103. However, the use of the non-excitation electromagnetic brake is not limited to the motor 103, and the present invention can be applied to any mechanism having a rotatable shaft.

Figure 5:
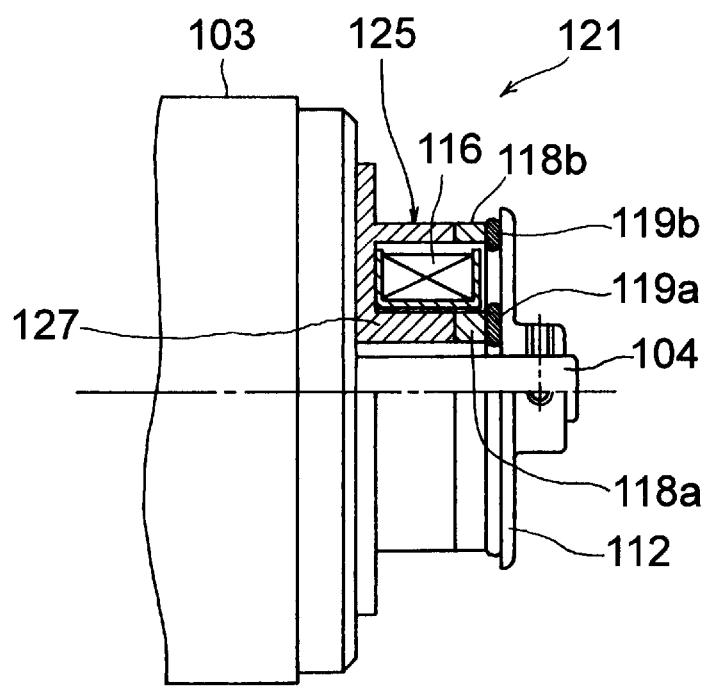
FIG. 5 is a side view of a modification of a non-excitation type electromagnetic brake of the third embodiment, the upper half thereof being shown in cross section.

FIG. 5 is a side view of a modification of a non-excitation type electromagnetic brake of the third embodiment, the upper half thereof being shown in cross section.

In comparison with the non-excitation type electromagnetic brake 111 shown in FIG. 4, a non-excitation type electromagnetic brake 121 shown in FIG. 5 is an example in which the two annular permanent magnets 118a and 118b are fixed to portions of a yoke member 127 having a double annular shape in an electromagnetic brake body 125 in an embedded manner so that they face the yoke member 127 and the magnetic pole directions thereof are reverse to each other in the axial direction. The magnetic fluids 119a and 119b are interposed or filled between the contact faces of each of the two annular permanent magnets 118a, 118b on the electromagnetic brake body side and the brake disc 112.

The operations of the non-excitation type electromagnetic brake 121 at the time of de-energized and energized are the same as those of the non-excitation type electromagnetic brake 111.

Figure 6:
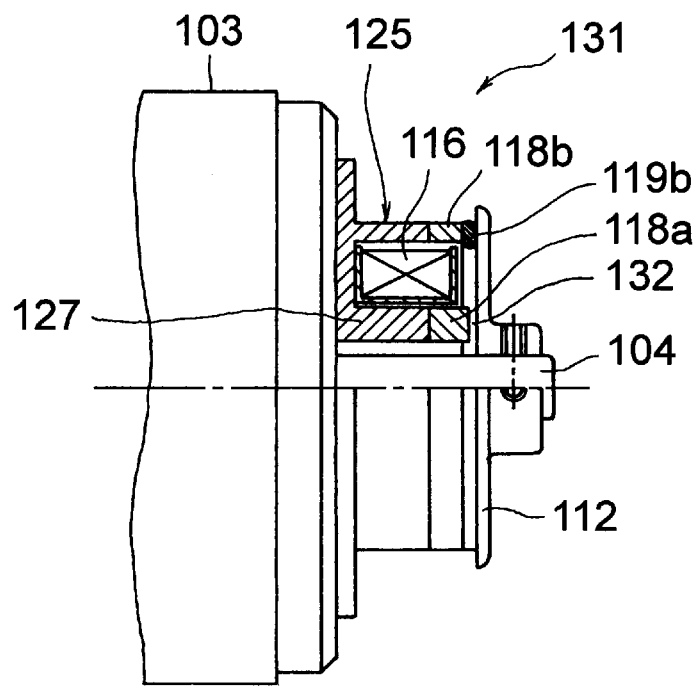
FIG. 6 is a side view of another modification of a non-excitation type electromagnetic brake of the third embodiment, the upper half thereof being shown in cross section.

FIG. 6 is a side view of another modification of a non-excitation type electromagnetic brake of the third embodiment, the upper half thereof being shown in cross section.

In comparison with the non-excitation type electromagnetic brake 121 shown in FIG. 5, a non-excitation type electromagnetic brake 131 shown in FIG. 6 is an example in which a small air gap 132 is formed between the contact faces of the inside permanent magnet 118a, of the two annular permanent magnets 118a and 118b, and the brake disc 112. In the portion in which the air gap 132 is formed, the magnetic fluid 119b is interposed or filled.

The operations of the non-excitation type electromagnetic brake 131 at the time of de-energized and energized are the same as those of the non-excitation type electromagnetic brake 111. In this case, the air gap 132 exists in the magnetic path in the electromagnetic brake body 125, which decreases the efficiency, but offers an advantage that the quantity of magnetic fluid used can be decreased.

[Fourth Embodiment]

Figure 7:
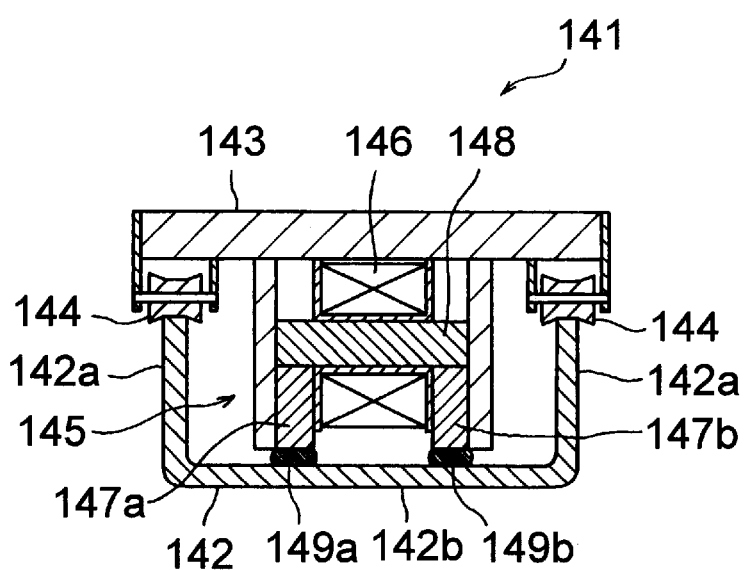
FIG. 7 is a sectional view of a non-excitation type electromagnetic brake, showing a fourth embodiment of an electromagnetic brake in accordance with the present invention, which electromagnetic brake is applied to a linear mechanism.
Figure 8:
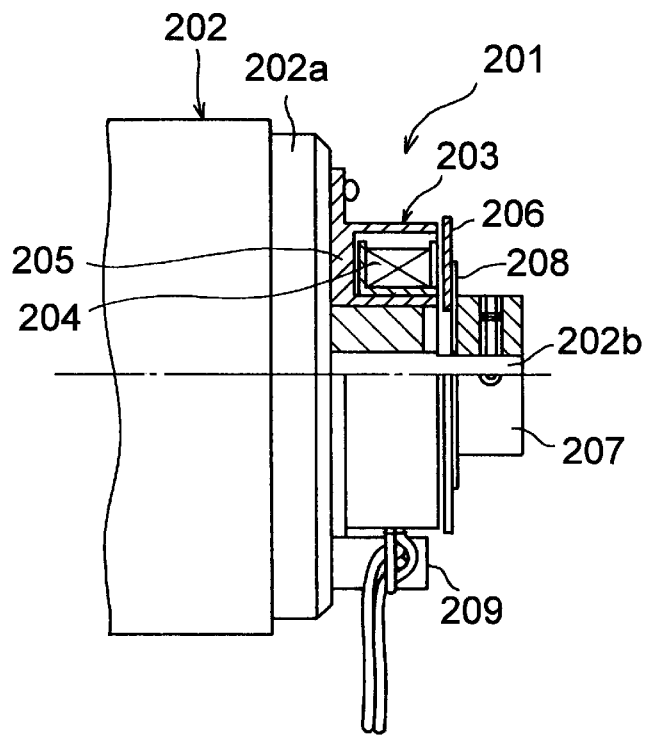
FIG. 8 is a side view of a conventional excitation type electromagnetic brake, the upper half thereof being shown in cross section.
Figure 9:
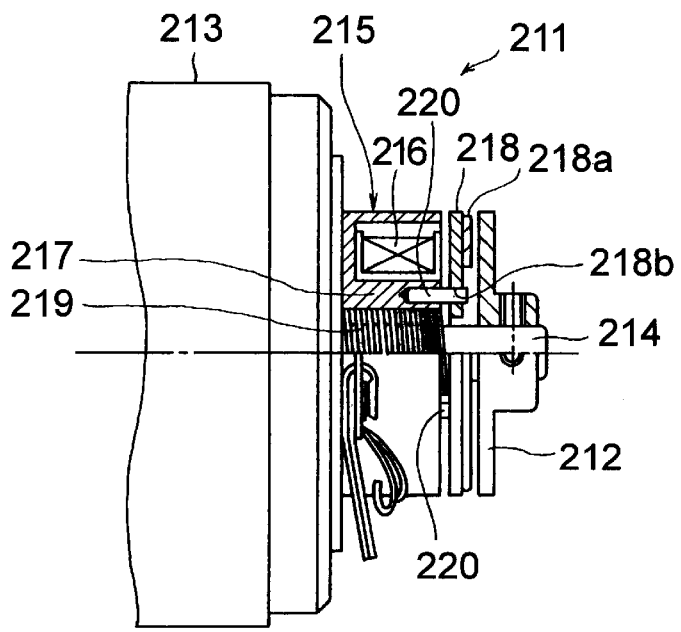
FIG. 9 is a side view of a conventional non-excitation type electromagnetic brake, the upper half thereof being shown in cross section.

FIG. 7 is a sectional view of a non-excitation type electromagnetic brake, showing a fourth embodiment of an electromagnetic brake in accordance with the present invention, which electromagnetic brake is applied to a linear mechanism.

Referring to FIG. 7, a non-excitation type electromagnetic brake 141 includes a guide rail 142 formed of a magnetic material, which has guide members 142a, 142a at both sides, an electromagnetic brake body 145 consisting of yoke members 147a and 147b formed of a magnetic material, which have a coil winding 146 installed under a carriage 143 formed of a non-magnetic material, and a permanent magnet 148 whose magnetic pole direction is the axial direction (left or right direction in the figure), around which the coil winding 146 is wound in a magnetic path formed by the electromagnetic brake body 145 and a bottom portion 142b of the guide rail 142. The carriage 143 to which the electromagnetic brake body 145 is installed is disposed on the guide members 142a, 142a via rollers 144, 144 so as to be capable of running.

For the two yoke members 147a and 147b, one end thereof abuts on the end portion of the permanent magnet 148, and the other end thereof is disposed so as to face the bottom portion 142b of the guide rail 142.

Magnetic fluids 149a and 149b are interposed or filled between the faces of the two yoke members 147a and 147b that face the bottom portion 142b of the guide rail 142 and the bottom portion 142b.

When the coil winding 146 is de-energized, the magnetic flux coming out of the permanent magnet 148 forms a magnetic path which passes through the yoke member 147a, the magnetic fluid 149a, the bottom portion 142b of the guide rail 142, the magnetic fluid 149b, the yoke member 147b, and the permanent magnet 148.

Thus, when the coil winding 146 is not excited, the magnetic fluids 149a and 149b are solidified by the flux of the permanent magnet 148, so that the yoke members 147a and 147b are fixed to the bottom portion 142b of the guide rail 142. Therefore, the carriage 143 is restrained on the guide rail, that is, the brake is applied. The carriage 143 is restrained and held in the linear direction by the shearing force of the magnetic fluids 149a and 149b generated by the permanent magnet 148.

Next, the coil winding 146 is excited, by which the direction of magnetic force in the electromagnetic brake body 145 is made reverse to the direction of magnetomotive force of the permanent magnet 148. Thereby, the magnetic flux passing through the magnetic fluids 149a and 149b is decreased, that is, the intensity of magnetic field is reduced to release the solidification of the magnetic fluids 149a and 149b, thereby releasing the electromagnetic brake.

Thereupon, the carriage 143 can be run freely on the guide members 142a, 142a of the guide rail 142 via the rollers 144, 144.

As is apparent from the above description, according to the non-excitation type electromagnetic brake of this embodiment, wear of the braking portion is eliminated, whereby the service life thereof can be prolonged, and also a noise produced by the braking portion can be eliminated.

Also, according to this embodiment, there can be achieved an effect that in brake application, a movable portion is eliminated, so that the construction can be made simple, and also the number of parts can be decreased.

Further, since the shearing force of the magnetic fluid can take a larger value than that of friction, the brake itself can be made smaller.

The art of the present invention is not limited to the art described in the aforementioned embodiments. Another mode of means that performs the same function may be used, and also various changes and additions of the art of the present invention can be made without departing from the spirit and scope of the invention.

What is claimed is:

1. An electromagnetic brake comprising an electromagnetic brake body having a yoke member with a coil winding and a brake movable member formed of a magnetic material, which is disposed via an air gap in a magnetic path formed by said electromagnetic brake body and is fixed to a rotating shaft, wherein
   a magnetic fluid is interposed or filled in said air gap, and fluid leakage preventive means is formed or disposed between said electromagnetic brake body and said brake movable member to prevent said magnetic fluid from leaking to the outside, whereby said rotating shaft is braked using said electromagnetic brake when said coil winding is excited.

2. The electromagnetic brake according to claim 1, wherein said fluid leakage preventive means is a sealing member, and said sealing member for rotatably sealing said rotating shaft is disposed to prevent said magnetic fluid from leaking from between said electromagnetic brake body and said rotating shaft.

3. The electromagnetic brake according to claim 1 or 2, wherein said brake movable member is a disc fixed at the end of said rotating shaft.

4. An electromagnetic brake comprising an electromagnetic brake body having a yoke member with a coil winding so that a rotating shaft is disposed via an air gap in a magnetic path formed by said electromagnetic brake body, wherein a magnetic fluid is interposed or filled in said air gap, and a sealing member for rotatably sealing said rotating shaft is disposed to prevent said magnetic fluid from leaking from between said electromagnetic brake body and said rotating shaft, whereby said rotating shaft is braked using said electromagnetic brake when said coil winding is excited.

5. An electromagnetic brake comprising an electromagnetic brake body having a yoke member with a coil winding, a brake movable member formed of a magnetic material, which is fixed to a rotating shaft, and a permanent magnet disposed in a magnetic path formed by said electromagnetic brake body and said brake movable member, wherein a magnetic fluid is interposed or filled between said electromagnetic brake body and said brake movable member, and the direction of magnetic force in the excited state of said electromagnetic brake body is made reverse to the direction of magnetomotive force of said permanent magnet, whereby the brake of said rotating shaft is released using said electromagnetic brake, and braking action is performed in a non-excitation state.

6. The electromagnetic brake according to claim 5, wherein said permanent magnet is disposed on a side of said brake movable member.

7. The electromagnetic brake according to claim 5, wherein said permanent magnet is disposed on a side of said electromagnetic brake body.

8. The electromagnetic brake according to claim 5, wherein an air gap is formed in a portion between said electromagnetic brake body and said brake movable member in which said magnetic fluid is interposed or filled.

9. An electromagnetic brake comprising a guide rail formed of a magnetic material; an electromagnetic brake body having a yoke member with a coil winding, which is mounted on a carriage formed of a non-magnetic material; and a permanent magnet disposed on said electromagnetic brake body in a magnetic path formed by said electromagnetic brake body and said guide rail, said carriage on which said electromagnetic brake body is mounted being disposed on said guide rail via a roller so as to be capable of running, wherein a magnetic fluid is interposed between said electromagnetic brake body and said guide rail, and the direction of magnetic force in the excited state of said electromagnetic brake body is made reverse to the direction of magnetomotive force of said permanent magnet, whereby said electromagnetic brake is released, and braking action is performed in a non-excitation state.

* * * * *